US005464971A

United States Patent [19]

Sutcliffe et al.

[11] Patent Number: 5,464,971

[45] Date of Patent: Nov. 7, 1995

[54] APPARATUS AND METHOD FOR RECEIVING AND PROCESSING A BET

[76] Inventors: Peter H. Sutcliffe, 16 Brewery Yard, Fennay Bridge, Huddersfield, Great Britain, HD8 0AR; Peter Smith, Ingleby Cottage, Kearby, Near Wetherby, Great Britain, LS22 4BU

[21] Appl. No.: 108,705

[22] PCT Filed: Mar. 12, 1992

[86] PCT No.: PCT/GB92/00449

§ 371 Date: Jan. 31, 1994

§ 102(e) Date: Jan. 31, 1994

[87] PCT Pub. No.: WO92/16914

PCT Pub. Date: Oct. 1, 1992

[30] Foreign Application Priority Data

| | | | |
|---|---|---|---|
| Mar. 12, 1991 | [GB] | United Kingdom | 9105164 |
| Apr. 3, 1991 | [GB] | United Kingdom | 9106953 |

[51] Int. Cl.$^{6}$ ..................... G06F 15/30

[52] U.S. Cl. ..................... 235/379; 235/419

[58] Field of Search ..................... 364/410, 411, 364/412; 235/379, 419, 375

[56] References Cited

U.S. PATENT DOCUMENTS

| | | | |
|---|---|---|---|
| 4,074,324 | 2/1978 | Barrett . | |
| 4,108,364 | 8/1978 | Tanaka et al. . | |
| 4,264,808 | 4/1981 | Owens | 235/379 |
| 4,832,341 | 5/1989 | Muller et al. . | |

FOREIGN PATENT DOCUMENTS

| | | |
|---|---|---|
| 458244 | 12/1971 | Australia . |
| 0109038 | 5/1984 | European Pat. Off. . |
| 0240203 | 10/1987 | European Pat. Off. . |
| 0304519 | 3/1989 | European Pat. Off. . |
| 2071369 | 9/1981 | United Kingdom . |
| 2089165 | 6/1982 | United Kingdom . |

*Primary Examiner*—Donald Hajec
*Assistant Examiner*—Karl D. Frech
*Attorney, Agent, or Firm*—Nixon & Vanderhye

[57] ABSTRACT

In a betting shop terminal, a betting slip is inserted into a slot, and pressed against a glass plate by means of a hinged plate. A CCD camera generates an electrical image of the betting slip, and stores it in a memory. A thermal printer generates a hard copy of the image of the betting slip, from the stored electrical image signal, together with additional information, to form a receipt for the customer. The additional information comprises a unique serial number, the amount of the stake, and optionally the time of the bet. This information is stored also in the memory, together with the electrical image. The bet can be fully entered at a later time, subsequent to the transaction, by a settler, using the terminal or an alternative terminal. Winning bets are automatically calculated from the entered information and race information received from a remote station. A plurality of such terminals intercommunicate to process shared data. A remote station can receive data relating to bets taken etc., from the terminal over a communication link.

26 Claims, 5 Drawing Sheets

FIG. 2
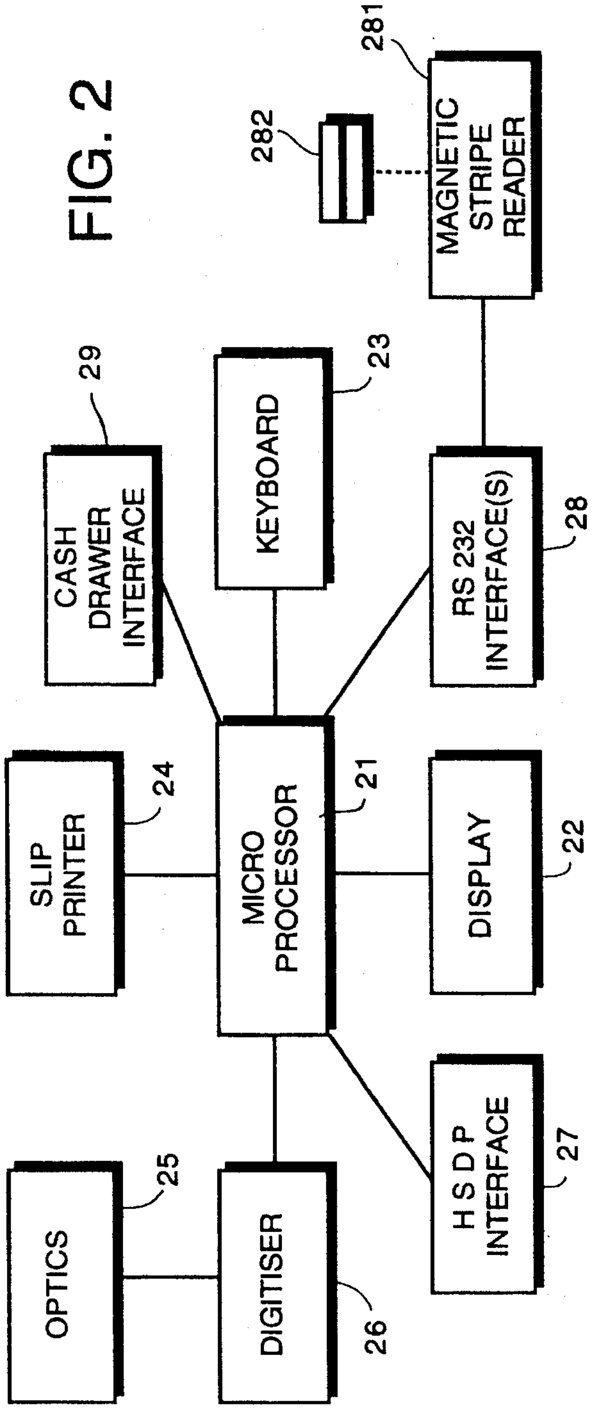
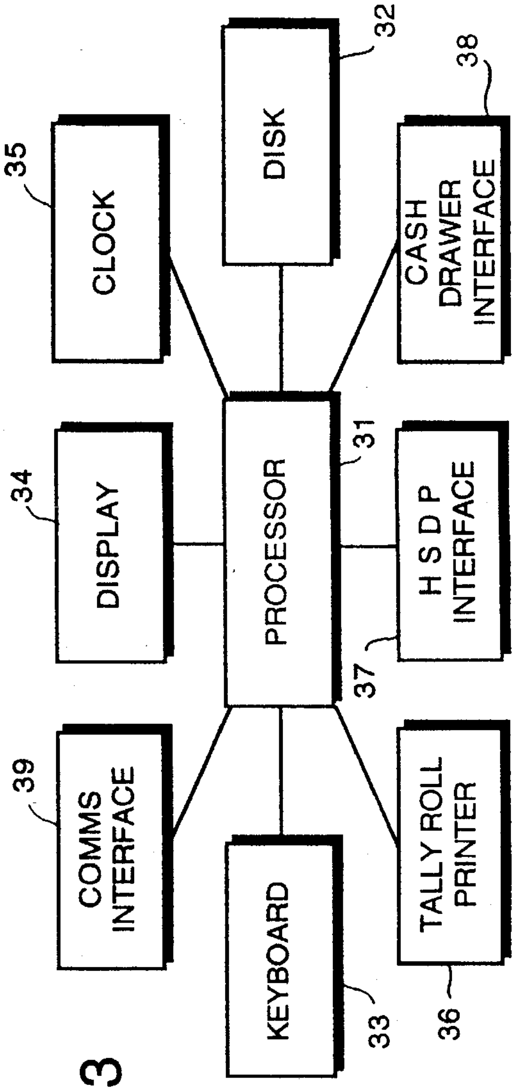
FIG. 3

APPARATUS AND METHOD FOR RECEIVING AND PROCESSING A BET

This invention relates to apparatus and methods for receiving and processing bets.

BACKGROUND OF THE INVENTION

In a known betting shop system, a customer wishing to place a bet fills out his own betting slip. The slip is in two pans, a top copy and a bottom copy. Anything written on the top copy is copied onto the bottom copy by a known chemical process. The details written on the slip relate to the place and time of the race, the name of the horse or dog selected, and the amount of the stake. The customer has a choice of starting price or board price odds. Starting price odds are the odds prevailing at the start of the race itself. Board price odds are the odds that prevail at the time of the bet. If a customer asks for a board price, the till operator usually verifies the odds by referring to continually updated information supplied to the betting shop. Once the odds have been verified, they are written on the slip by the till operator, and highlighted by, for example, the till operator putting a red ring around the odds. The till operator then takes the stake money from the customer, puts the slip in a print mechanism of the till and enters the stake on the till, whereupon the stake value and a unique serial number are printed on the top and bottom copies of the slip. The till operator then puts the stake money in the till drawer, removes the slip from the till print mechanism, parts the two halves of the slip, gives the bottom copy to the customer and feeds the top copy through a camera mechanism where a photograph is taken, the camera mechanism containing a digital clock which is photographed along with the betting slip to establish the time the bet was taken. The photograph serves as a permanent record of the details of the bet, including the board price if taken, and the time the bet was taken.

The till operator retrieves the top copies of the slips from the camera mechanism and passes them to the settler.

The function of the settler is to scrutinise the bets in order to compute the value of winning bets. The settler enters the value of a win onto the top copy of the slip and passes it to the payout operator. Losing slips are put to one side.

When a customer presents the bottom copy of a winning bet to the payout operator, the two parts of the slip are scrutinised to see that no alterations have been made. If all is correct, the payout operator gives the customer the amount written on the top copy of the slip by the settler, attaches the two pans of the slip together, and passes them to the settler.

The camera record and winning and losing slips are taken to Head Office from time to time, where they are inspected in an attempt to detect if any cheating is occurring, either by a customer and/or by betting shop personnel.

A problem with known betting shop systems is that if a board price is requested, it must be manually applied to the betting slip. As the odds vary over a period of time, errors may be made by the operator, and the wrong odds may be applied.

A second problem is that it is not easy to go back and check that the odds applied to the slip were correct at the time the bet was taken, since the photographic record that is taken is not immediately and conveniently available, and this record has to be checked against a master record of the day's events.

A third problem is that the verification of a winning bet by the payout person is time consuming.

A fourth problem is that the settler calculates the value of winning bets manually and can make mistakes. Generally customers inform the shop staff of underpays but not overpays, and consequently the shop's profitability is reduced.

A fifth problem is that, if the bet is a multiple bet having several selections in the form of doubles, trebles and accumulators, the settler has to handle the bet several times, thus increasing the possibility of error.

A sixth problem is that the security checking of camera records against slips can only be done when the film and bets have been collected from the shop and the film processed. This may entail a delay of three to four weeks.

A further problem is the time taken to check a winning bet against the camera records since the photograph of the bet has to be found on the film.

Australian Patent publication AU-A-458 244 discloses in detail operation of the well-known "PARIMUTUEL" betting system. This mechanised system uses a "mark sense" coupon to input a selection of possible bet data, issues a ticket on which the bet data is magnetically coded and printed on the ticket, calculates the values of winning bets on a pool-sharing basis, and pays out accordingly to winning tickets. It has no facilities for forming images of betting coupons, and indeed, the system has no use for such images.

SUMMARY OF THE INVENTION

Preferred embodiments of the present invention aim to provide betting shop systems, or apparatus or methods therefor, which may be improved in the foregoing respects.

According to one aspect of the present invention, there is provided apparatus for receiving and processing a bet, comprising:

(a) first input means for receiving first input data relating to an event on which bets are to be taken;

(b) second input means for receiving second input data relating to an individual bet on said event, said second input means comprising an input portion for receiving a slip having characters thereon;

(c) receipt generating means for generating a receipt for said second input data;

(d) storing means for storing said first and second input data; and (e) calculating means for calculating the payout value of a bet from said first and second input data: wherein:

(1) said apparatus further comprises:

electrical imaging means for forming an image of at least part of a slip in or at said input portion and generating an electrical image signal representing said image; and output means for receiving said electrical image signal and processing the signal to display the image on a display means and/or print a hard copy of said image:

(2) said storing means is arranged to store said electrical image signal together with the respective said second input data; and (3) said receipt generating means is arranged to generate a receipt which comprises either said hard copy or at least part of said slip, together with additional identifying information.

Preferably, said second input means comprises a recess to receive a slip therein.

Preferably, said electrical imaging means comprises a two-dimensional array of charge-coupled devices.

Said output means may comprise a thermal printer.

Said receipt may comprise said hard copy and said additional identifying information may be adjacent said image on said hard copy.

Apparatus as above may further comprise key means for entering control instructions for said apparatus and/or data to be stored by said storing means and/or information which is displayed on said receipt.

Preferably, said storing means is arranged to store successive said image signals together with their respective second input data.

Preferably, said output means comprises display means for displaying said image, and is arranged to control the display means to selectively display an image corresponding to a selected one of said image signals stored in said storage means.

Preferably, said output means comprises display means for displaying a respective said image, and is arranged to control the display means to display simultaneously, in predetermined positions, the respective said image together with data fields for displaying at least some of said input data.

Said output means may be arranged to control the display means to display said image and data fields together on a common screen.

Said output means may be arranged to control the display means to display said data fields in the layout of at least one form separate from said image.

Preferably, said second input means comprises means whereby a user can input items of said second input data, which items are displayed in said data fields.

Said second input means and output means may be arranged to recognise initial character entries from a user and display at least one data item that has initial characters corresponding to said initial character entries from the user.

Said output means may be arranged to control the display means to display multiple choice data items in said data fields, which items are selectable in response to data input by a user by said second input means.

Said output means may be arranged to control the display means to display selected data items in said data fields in different video modes.

Said second input means may comprise a reader for reading marks on a mark sense slip in or at said input portion.

Apparatus as above may further comprise a cash drawer.

Apparatus as above may further comprise a magnetic card reader, means for carrying out a transaction with a card read by said reader, and means for storing data corresponding to an amount of money received by such a transaction.

Apparatus as above may further comprise a bar code reader for reading a bar code on a said receipt, means for decoding the read bar code, and means for retrieving from said storing means a respective said image signal and second input data relating to said receipt.

Apparatus as above may further comprise communication means for receiving and/or transmitting data from and/or to a remote station.

Preferably, said first input means is arranged to receive said first input data from a remote station, by means of said communication means.

The invention extends to a plurality of apparatuses as above, arranged to share and process common data.

The invention extends also to a combination of at least one apparatus according to any of the preceding aspects of the invention, together with a said slip on which said characters represent said second input data.

The invention extends to a betting shop provided with at least one apparatus according to any of the preceding aspects of the invention.

According to another aspect of the present invention, there is provided a method of receiving and processing a bet, comprising the steps of:

locating a slip in or at said input portion of said second input means of an apparatus according to any of the preceding aspects of the invention;

receiving said first input data by means of said first input means;

forming an image of said slip in or at said input portion of said second input means and generating an electrical image signal representing said image, by means of said electrical imaging means;

receiving said second input data by means of said second input means;

storing said electrical image signal together with the respective said second input data, by means of said storing means;

receiving said electrical image signal and processing the signal to display the image on a display means and/or print a hard copy of said image, by means of said output means;

generating a receipt which comprises either said hard copy or at least part of said slip, together with additional identifying information, by means of said receipt generating means; and calculating the payout value of a bet from said first and second input data, by means of said calculating means.

Preferably, said second input means comprises means whereby a user can input items of said second input data, which items are displayed in said data fields, and a user enters items of said second input data by reading data from the respective image displayed by said display means and entering that data in at least some of said data fields.

BRIEF DESCRIPTION OF THE DRAWINGS

For a better understanding of the invention, and to show how the same may be carried into effect, reference will now be made, by way of example, to the accompanying diagrammatic drawings, in which:

FIG. 2 is a block diagram of a till of the system of FIG. 1;

FIG. 3 is a similar block diagram of a settler-payout terminal of the system of FIG. 1;

DETAILED DESCRIPTION OF THE INVENTION

Figure 1:
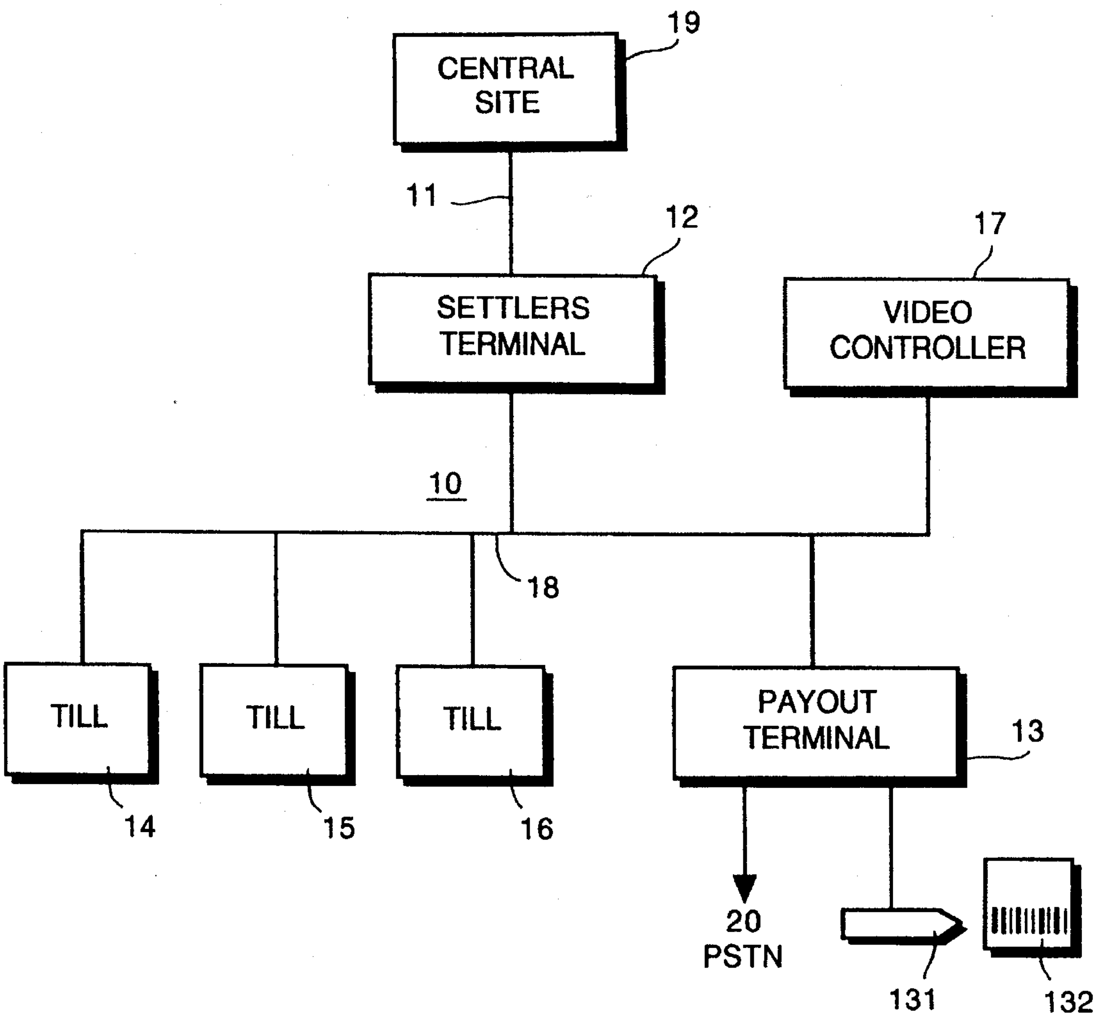
FIG. 1 is a schematic diagram of an example of a betting shop system according to the present invention.

Referring to FIG. 1, a betting shop system 10 comprises a settlers terminal 12, a payout terminal 13, three tills 14, 15, 16 and a video controller 17. The units 12 to 17 communicate with one another via a high speed data path (HSDP) 18. The HSDP 18 comprises a two-wire multi drop line. The settlers terminal 12, which acts as a master terminal, continuously polls the other terminals (slaves) to see if data interchange is required. If it is, the source and destination between which the data is to be interchanged are informed by the master, and the transfer takes place. The data rate over the HSDP 18 is preferably a minimum of 1 megabit per second.

In the event that one of the slaves fails, the operation of the HSDP will not be affected. Also, if the settlers terminal (the master) fails, the payout terminal 13 will become master.

An alternative communications system, such as, for example, a simple ring connection of terminals via their communications ports, may be employed— optionally at a lower data transmission rate.

A communications network 11 interfaces a central site 19 to the settlers terminal 12. The central site contains data relating to races on which bets may be taken. Data received from the central site 19 is stored in the settlers terminal 12 and transferred over the HSDP 18 to the relevant recipients. Data received or generated by the settlers terminal 12 is stored and passed to the central site 19 when polled by the central site 19.

Referring to FIG. 2, a till 14 is shown in more detail. The till is a self-contained unit comprising the elements shown in FIG. 2.

The till comprises a microprocessor 21 system optimised to the tills functionality. Any expansions may be carried out by an internal add-on card or via an RS232 interface.

Software for the till is downloaded from the master 12 on power-up, thus enabling easy update of operational parameters.

Information relating to a transaction may be displayed on a display 22, which comprises a 256×64 liquid crystal display (LCD) whose prime function is to display an amount entered by a keyboard 23. Its secondary, function is to display information, and to this end it can be perceived as a 40×8 character display.

Information relating to the amount of a stake, and details of the race and horse and/or dog (for example) may be input into the till by means of the keyboard 23. The keyboard may comprise numeral keys 0 to 9 as well as keys which enable information to be cancelled, entered, copied or displayed in a usual manner. To enter the value of a bet, the operative presses the relevant numerical key(s) followed by the enter key. A cancel key is used to correct mistakes. To look at current betting information, the operator presses a "current show" key, whereupon the details of the next race to be run are displayed on the LCD 22. Further depressions of the current show key cause the next but one, next but two, etc. races to be displayed.

A slip printer 24 is similar to a conventional slip printer, but with a normal bet, only prints one line on the bottom copy, which is typically offset from the top copy. This line consists of a unique bet serial number and bet value—and optionally the time of the bet. The printer has, however, the ability to print more than one line by line feeding the slip.

Whilst the slip is in the slip printer 24 and printing is taking place, optics 25 focus the written area of the bet onto a charge-coupled device (CCD). A digitiser 26 consists of an analogue to digital convertor and timing element, and its function is to take an electronic "picture" of the bet in monochrome, by means of the CCD. The optics 25 and the digitiser 26 together replace the flow camera used in known betting shop systems.

The tills 14 to 16 can communicate with the master 12 via the HFDP 18. The information communicated may include:

1. Bet serial number and time (from the master);
2. Bet value (to the master);
3. Digitised picture (to the master);
4. Betting information (from the master).

All information between master and slaves is archived by the payout terminal 13 (FIG. 1) in order that, should the master 12 fail, the payout terminal 13 can act as master.

The RS232 interface 28 may be used for simple expansion—for example, to control such peripherals as a special purpose printer, or a magnetic stripe reader 281 for reading credit cards 282. A cash drawer interface 29 comprises a conventional till output to open the cash drawer.

The settlers terminal 12 and payout terminal 13 are identical in that they run the same program and maintain identical databases.

The settlers terminal 12 is connected to the communications network 11, whereas the payout terminal is connected to the public switch telephone network (PSTN) 20. In practice, the only difference between the settlers terminal 12 and the payout terminal 13 is that the settlers terminal 12 acts as HSDP 18 master and interfaces to the communications network 11, whilst the payout terminal 13 acts as HSDP 18 slave. In the event of communications network 11 or settlers terminal 12 failure, the payout terminal 13 can take over as HSDP 18 master, communicating with the central site over the PSTN 20.

The settlers terminal and payout terminal are shown in more detail in FIG. 3. The settler/payout terminal 12, 13 comprises a processor 31 comprising a 386 motherboard with sufficient memory to run the application and having a comms interface 39. Additional memory slots will be available for expansion. A disc 32 is used to hold various types of information which includes the days runners and results, ante post betting information, the tills' program, the video systems program, a copy of the video systems database; digitised pictures of bets taken; bet details as entered by the settler; an audit trail for the Customs and Excise; and a copy of the terminals program. A keyboard 33 comprises a standard PC keyboard having full QWERTY, numeric pad and function keys. However, a special purpose keyboard may be used if desired.

A display 34 is a standard monochrome cathode ray tube (CRT) driven from a video store. This enables the screen to be used to display the digitised picture of a bet as well as alphanumeric information in various sizes and shades of grey (or other colour).

A clock 35 in the terminal is set periodically by the clock at the central site 19 (FIG. 1). This ensures that the central site and all shops in the system are synchronised with respect to time. A tally roll printer 36 may be attached to the terminal if required—e.g. for the Customs and Excise. HSDP interface 37 allows the terminal to communicate with the rest of the system 10.

A cash drawer interface 38 is similar to the cash drawer interface 29 described in FIG. 2 in relation to the till.

The PSTN interface 20 enables the payout terminal 13 to gain access to the public packet switching network in order that pool bets can be transferred to a pool computer.

The video controller 17 (FIG. 1) comprises a multi-screen bit-mapped graphic system, and its function is to display betting information and results in a quality form. The video controller 17 receives an overnight transmission of its database from the central site 19, which comprises race and display information. When the shop is open, the central site 19 transmits data which includes current prices, results, ante post price changes, and what to display on each screen.

The settler/payout terminal 12, 13 receives this information concurrently in order to establish copies of the video controller 17 database and for bet acceptance and settling. Current betting information received from the central site may be displayed on one or more video display system.

The betting shop system 10 works as follows.

A customer wishing to make a bet gives a betting slip with the appropriate money to a till operator who puts the slip in the printer 24 of the till 14, and subsequently takes the slip out of the printer 24. If the customer has requested a board price, the till operator may enter the requested board price manually onto the slip or call up on the till the prevailing odds and enter them manually onto the slip, prior to putting the slip in the printer 24. Alternatively, the operator may cause the till to print the odds on the slip while in the printer—either automatically from current racing information received from a central site, or by keyboard entry by the operator. Following printing, the operator then divides the slip into two parts and gives the customer the bottom copy, whilst putting the top copy on a pile by the till.

While the slip was in the slip printer 24 in the till 14, the betting system 10 has allocated the betting slip a unique serial number, and printed the unique serial number and the amount taken on the bottom copy of the slip. Some or all of the printed data may be in bar code form. In addition, the time at which the slip was printed has been noted, and a digitised picture of the betting slip has been taken and recorded on the disk 32 in the settlers/pay out terminal along with the serial number, amount of bet, the time of the bet and board price if applicable.

The serial number may be chosen to have two check digits. This means that an operator would have to make three keying errors in order to select an unintended bet.

Figure 4:
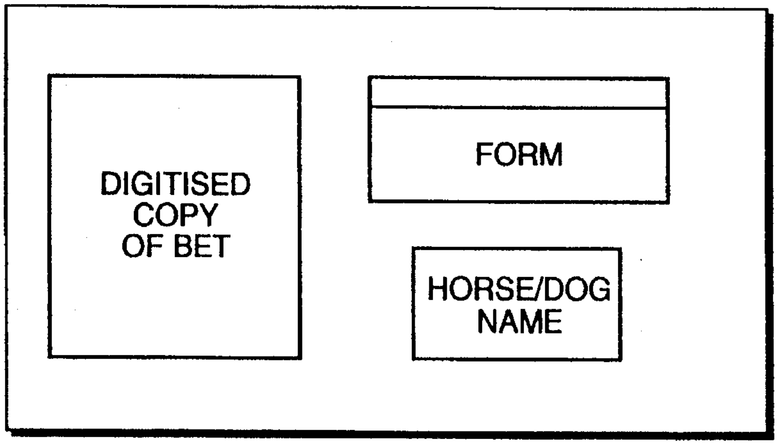
FIGS. 4 and 5 are schematic diagrams of display screens of a settler-payout terminal.
Figure 5:
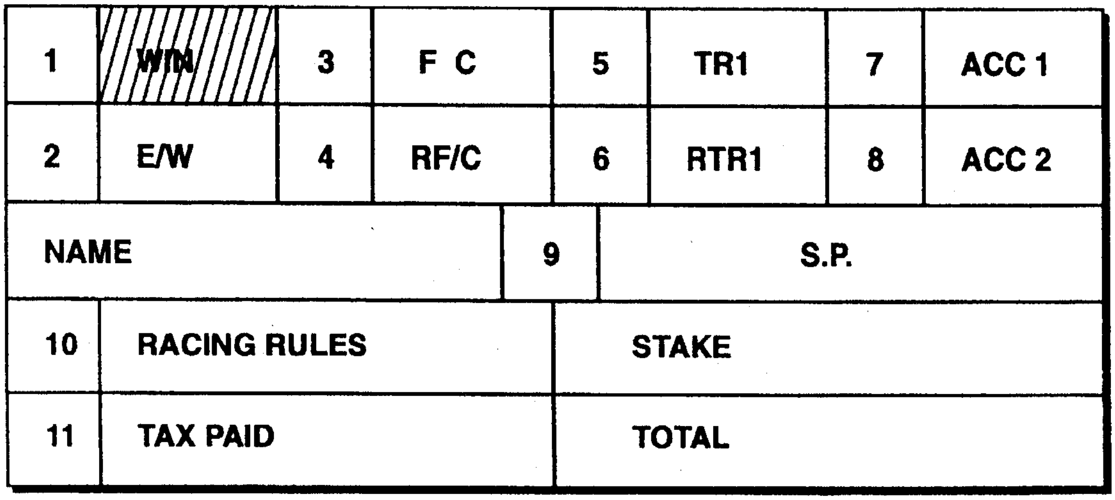

In due course the settler may call up the picture of the bet on the settlers terminal from the storage means, read the information on the slip and enter the bet into the terminal in a form understandable to the terminal. The bet entry may be effected by an operator operating the settler/payout terminal. In order to enter a bet into the system, the terminal operator selects the bet to be entered, causing the terminal to bring up the digitised copy of the bet onto the display 34, together with a form shown in FIGS. 4 and 5. The operator is then able to fill in on-screen the form required to enter the bet by means of the keyboard.

It will be noted that the operator of the terminal 12, 13 only has to look at the screen of the terminal, and the physical copy of the bet is not required.

When a bet entry is completed, the next unentered bet in sequence is automatically brought up on display. To select a particular bet, the operator enters the bet serial number. If required, the operator may skip over a bet, and the display will continuously show the number of unentered bets behind and in front of the bet currently on display.

By means of the keyboard, the operator selects the bet type, which may be displayed in reverse video, "WIN" (field 1) may be a default selection (shown in reverse video in FIG. 5), with "EACH WAY" (field 2) an optional alternative. If forecast or reverse forecast (fields 3 and 4) are selected, the space for the name and SP (Starting Price) (field 9) is increased to 2 lines. Similarly, if tricast or reverse tricast (fields 5 and 6) are selected, the space is increased to 3. If an accumulator (field 7 or 8) is selected, the display changes to a menu to allow the relevant accumulator to be selected.

To enter a horse/dog name, the operator begins to type characters. After each key depression, a list of names that begin with the letters so far entered is displayed below the table. When only one name is left the terminal fills in the rest of the name and "beeps" (tone 1). It also displays the race time and place. If several names have common lettering, the terminal "beeps" (tone 2) to allow the operator to skip over the common section.

To enter a horse/dog number, the operator types the race time and place followed by the number. When the terminal has identified the unique race (e.g. 12:34 H for the 12:34 at Hackney or 1:30 S for the 1:30 at Sandown) it "beeps" (tone 2) and fills in the remainder.

At field 9, the terminal defaults to SP, but if a board price was taken, the operator enters the board price, which is then displayed in reverse video. If the board price is already stored—either by automatic or keyboard entry at the till transaction—the stored odds are displayed automatically at field 9, in reverse video.

At fields 10 and 11, the operator may select between racing rules (default) and first past the post (reverse video), and tax paid (default) and not paid (reverse video). The terminal automatically enters the stake and total.

Reverse video is used so that the operator can see at a glance the type of bet entered.

The settlers terminal may receive information from the central site relating to the results of races, whereupon the terminal automatically settles the bets so far entered into the system and passes the results of those calculations to the payout terminal by means of the communication system.

When a customer has won a bet, he presents the bottom copy of the slip to the payout terminal operator. The operator then enters the serial number into the terminal, checks that the slip is valid, and pays the client his winnings as indicated by the terminal. Meanwhile, the betting shop system 10 has displayed the digitised copy of the bet on the terminal, and marked the bet as paid. If the serial number (and other data) on the slip was printed as a bar code 132, it may be read by a bar code reader 131 at the terminal (FIG. 1).

It will be noted that the payout terminal operator does not need the top copy of the slip, since it is automatically brought up on the display, thus easily enabling the operator to check that the slip is the correct one, and that it has not been interfered with.

The system may also be used to take pool betting. In pool betting, the customer puts marks on the betting slips to indicate the selection in a manner similar to that in which crosses (or other marks) are used on a football pool coupon. The bet is taken by the till operator in exactly the same way as a normal bet. The betting shop system 10 functions in a different way as follows.

It allocates the bet a unique serial number, takes a digital picture of the betting slip, decodes the bet from the digitised image, makes contact with the pool computer and informs it of the bet, and receives back from the pool computer a pool bet serial number. It then prints the two serial numbers, the amount taken and the bet onto the bottom copy of the slip. It further notes the time the slip was printed and records the bet, the digitised slip, the time and serial numbers onto the terminal disk 32.

If the pool computer does not respond within a time out period of say 3 seconds, only the serial number and the amount are printed and the slip is released. The till's display indicates that the transaction has not been completed. The till operator can then take the slip to one side and continue taking bets from other customers. When the transfer with the pool computer is complete, the message can be displayed on the till and the till operator can then re-enter the slip into the printer for the bet details to be printed.

The bet taken in this way does not need to be entered normally, as it was entered during the take process. When the results are received from the central site 18, the terminal makes contact with the pool computer and settles all winning bets. The pay out process is the same as described above for normal bet slips.

The betting shop system is useful in detecting whether any cheating is occurring. If any query arises in the shop, the shop personnel have available to them the top copy of the slip, a bottom copy of the slip, a digitised image of the slip, information relating to what was printed on the bet (serial number and amount) and the exact time the bet was taken. If when entering a board price, the price was not current at the time the bet was taken, the terminal "beeps" (tone 3) and displays the board prices with times. The operator take whatever action seems necessary in the circumstances. In this respect, it is to be understood that betting shop managers often have discretion to accept a bet at an earlier price, especially if taken just as the price is changing or has just changed.

The betting shop system 10 may be used in a chain of betting shops which have a head office. The head office can request any of the information held on the terminal disk 32, including bets entered together with the digitised copies, either on demand or as part of an overnight transmission. Due to the size of the digitised copies, it may not be practicable to transmit all bets from all shops to the head office overnight. However, all information entered by a terminal operator can be transmitted to the central site 18. The central site may send data to the head office as required.

The betting shop system 10 may also hold information concerning a complete day's operation. This operation can be packaged in whatever form is required and transmitted overnight.

By means of the betting shop system 10, all the functions of a betting shop maybe combined into one electronic whole. These functions may include:

1. Display of betting and result information.
2. The taking, settling and pay out of bets.
3. Security of betting shop operation, i.e. owners protecting themselves from clients and betting shop personnel.
4. Management information, i.e. take and pay out of shop, ratio of bet types.
5. Ante-post information not on display but available to shop personnel on request from clients.
6. Large bet verification and liability calculation.
7. Tracing of bet from placement to entry in accounts system, to satisfy Customs and Excise.
8. The taking and processing of pool bets.

The betting shop system 10 described above comprises three tills 14. However it is to be understood that the system 10 may comprise any number of tills, settling and payout terminals.

The betting shop system 10 is particularly useful in providing a totally automated betting system which may be used to co-ordinate activities occurring in a number of shops in a chain, in supplying a head office of the chain with relevant information.

By using a digitised image of the betting slip, pool bets of the mark sense type can conveniently be processed, and thus do not require a separate mark sense reader. "Mark sense" type betting slips are those where predetermined selections are marked with a cross, or other character or mark. A reader reads the characters or other marks on the slip.

Figure 6:
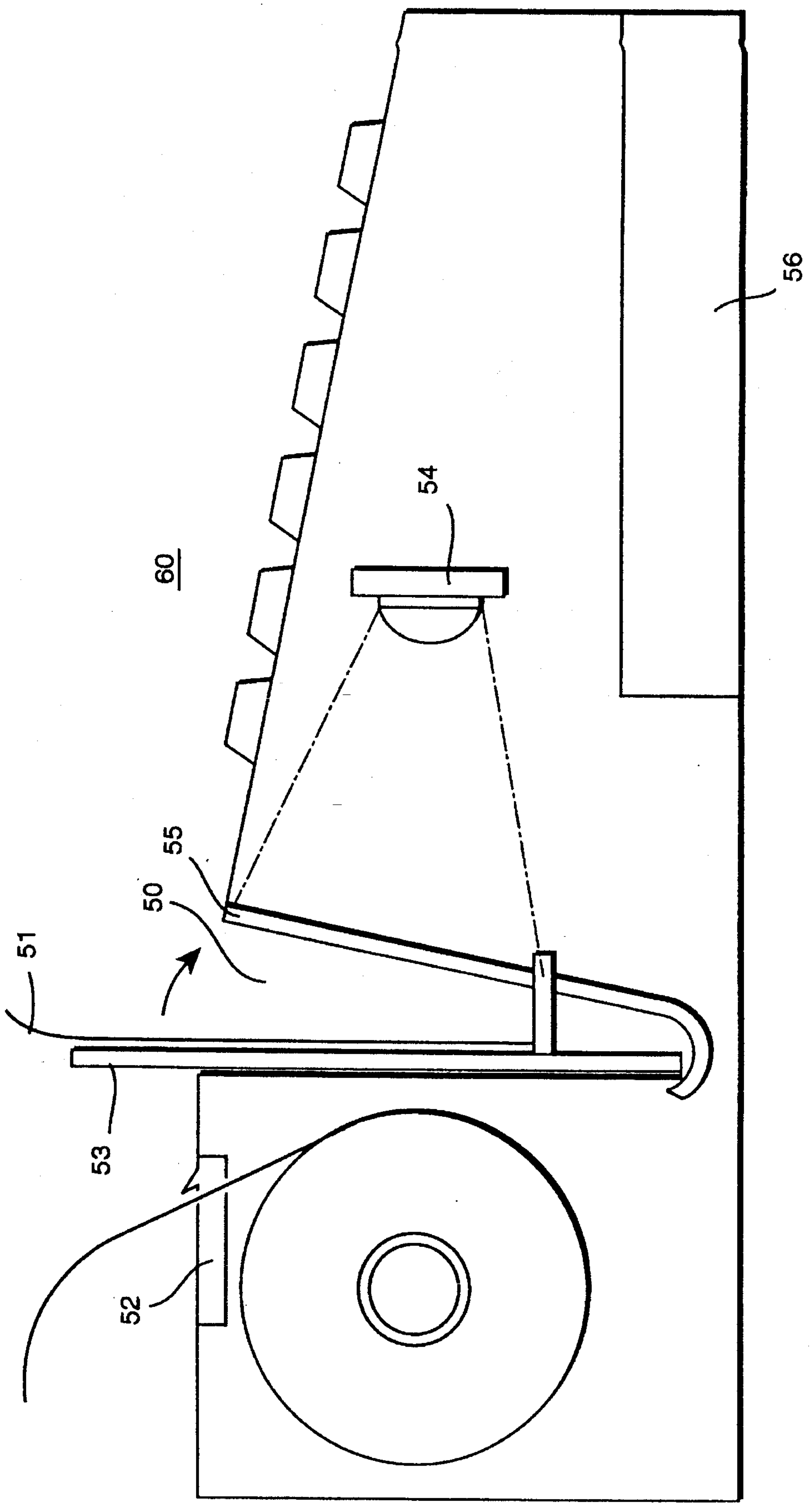
FIG. 6 illustrates, in longitudinal section, one example of part of a preferred apparatus embodying the invention.

FIG. 6 shows schematically an improved terminal 60 for inputting betting slip details. This comprises a receiving slot 50 into which a betting slip 51 can be introduced after relevant details have been written and/or printed thereon. A support for the slip 51 comprises a back plate 53 which is preferably, though not essentially hingedly mounted, and which can be moved manually to a position against a glass plate 55, such that the information on the slip can be focused onto a CCD device 54 which then takes an electronic picture of the slip. The information on the slip therefore is moved to a position in which it can be "photographed" through a lens system. Preferably, the device houses means to use a CCD which is interfaced to a microprocessor in order to record digitally an electrical signal representing the image of the information on the slip 51. A cash drawer 56 is provided.

The printer 52 is preferably a thermal printer, and produces a receipt comprising an electronic "picture" of the betting slip 51 which was obtained by putting the betting slip 51 against the glass plate 55 and focusing the written area of the bet onto the charged coupled device 54.

An example of operation of the modified system of FIG. 6 is as follows.

The betting slip 51 is in one part. A customer wishing to make a bet gives the betting slip 51 with the appropriate money to a till operator who puts the slip in the slot 50, enters the value of the bet into the till and puts the money in the cash drawer. During this process an electronic "picture" of the betting slip is taken and a facsimile of the bet is printed on the thermal printer 52 together with a unique serial number, bar code, the amount taken, and optionally the time of the bet. The operator gives the customer the facsimile of the bet and puts the original slip on a pile by the till.

When a customer has won a bet, he presents the facsimile of the bet to the payout operator who uses a bar code reader to enter the serial number into the payout terminal.

Delayed-time entering of the bet by a settler, calculation of a winning amount, and payout procedure, may be generally as described above with reference to the preceding embodiments.

The modified system can also be used for pool bets. The single piece coupon is read by the till and the bet details together with unique serial number and bar code are produced on the printer and given to the customer. The coupon is put on a pile by the tile.

The system contacts the pool computer over the PSTN or other network, as outline above in relation to the preceding embodiments. If the pool computer does not respond within a time out period, a message is displayed on an LCD display, informing the operator to continue taking other bets. When the response occurs, the till informs the operator via the LCD, whereupon the operator can request the till to print out the bet and give it to the customer.

In the system described with reference to FIGS. 1 to 5, the tills 15, 16, 17 and the settler/payout terminals 12, 13 were of differing constructions. This is not essential. For example, a plurality of terminals such as illustrated in FIG. 6 may be provided in a betting shop, all provided with a display, keyboard, printer, CCD camera device, cash drawer, etc., all being networked together and linked to one or more external site. Each terminal may function as a till or a settlers/payout terminal, as required. They may each have a respective memory to store all data necessary. One or more may be configured as masters, storing data and communicating with the remaining slaves. A separate data storage and/or external communications terminal may be provided.

Thus by having a universal terminal such as shown in FIG. 6, a betting shop system may readily be installed, with as many terminals as necessary, each terminal being adaptable as a till, settler terminal or payout terminal, as demand requires. If preferred, a peripheral device such as a display screen or printer may be provided as a common device to one or more terminals.

As indicated above, delayed-time entering of a bet on a terminal such as that of FIG. 6 may take place in a manner similar to that described above with reference to FIGS. 1 to 5, with particular reference to FIGS. 4 and 5. Indeed, where practicable, features mentioned in relation to the embodiments of FIGS. 1 to 5 may be adopted in the embodiments of FIG. 6, and vice-versa. Features may similarly be exchanged with the embodiment of FIG. 7, described below.

Figure 7:
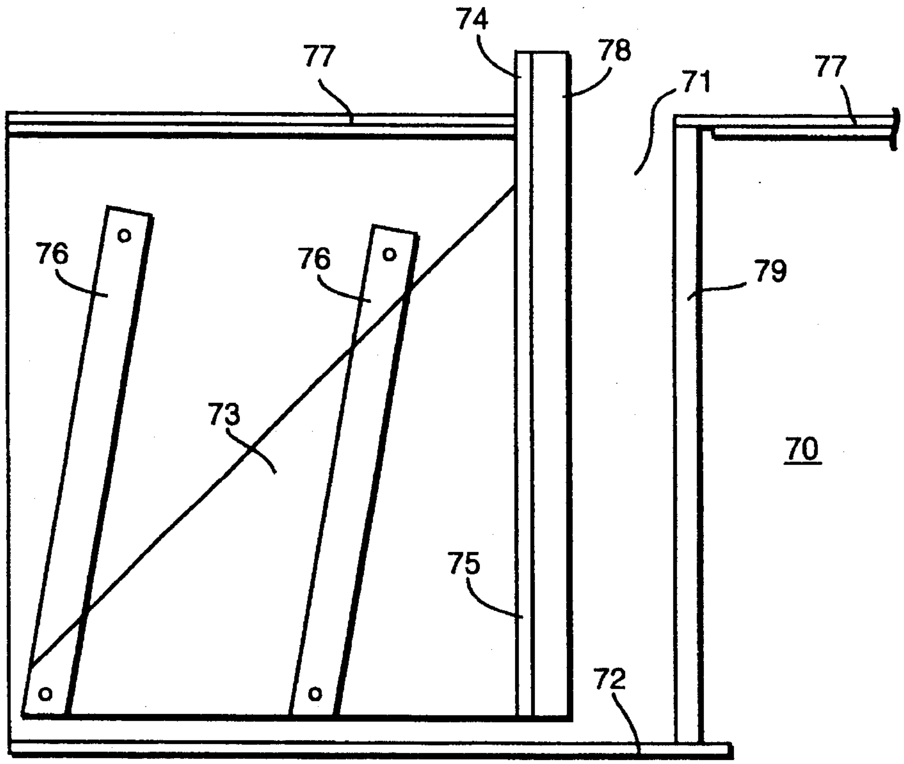
FIG. 7 illustrates, in longitudinal section, another example of part of a preferred apparatus embodying the invention.

In the terminal 70 of FIG. 7, an operator drops a betting slip into a slot 71, where its lower edge rests against a lower plate 72. The operator grasps an upstanding edge 74 of a plate 75, and moves a moveable assembly 73 to close the slot 71. The assembly 73 moves by a parallel-motion mechanism 76, whereby the plate 75 moves in parallel to a glass plate 79. The plate 75 preferably carries a sponge-rubber layer (or other soft facing) 78, which is urged by the operator against the glass plate 79, against which the slip is then pressed. At this point, a microswitch (or other detector) is operated, to cause a CCD camera device to take an electrical image of the slip at the glass plate 79.

The operator then releases the plate edge 74, which is resiliently biassed back to an open position, whereupon the slip may be removed from the slot 71.

Preferably, the illustrated parts (at least) of the terminal 70 are built into a counter or desk top, below which the operative parts are located out of the way. A top plate 77 of the terminal 70 may serve as a counter or desk top, or be mounted flush with such a top.

After the CCD camera has taken the electrical image of the betting slip, a hard copy thereof is generated by a printer, which is not shown in FIG. 7 but which may be, for example, a thermal printer similar to the printer 52 of FIG. 6. The hard copy forms a receipt, which carries additional information thereon, such as a unique identifying number, the amount of the stake, the time of taking the bet, etc. This information may be presented adjacent the image of the betting slip, or superimposed thereon. All or some of this additional information may be in the form of a bar code.

The additional information may be added to the electrical image of the betting slip as one or more further electrical signal, and processed simultaneously with the image signal in the printing (or other facsimile generating) step. Alternatively or additionally, it may be generated as a separate printing step, or the like.

The additional information may be entered, at least partially, by means of a keyboard, which is not shown in FIG. 7, but which may be similar to keyboards already illustrated and described above. It is preferred that at least some of the additional information, such as the unique serial number and time of taking the bet, is received directly from a central processing unit or memory—either of the terminal 70 or a remote station (local or external).

Some or all of the additional information may be printed or otherwise entered onto the original slip—for example, whilst in or entering the slot 71 or in a preliminary preprinting step or the like. If this is done before the CCD camera is operated, then the image may automatically include the additional information on it. In this case, the original slip may be returned to the customer as the receipt, and only the electrical image signals retained as the betting shop's record of the transaction. This gives the shop no automatic hard copy of the transaction, and therefore may be less satisfactory— although the additional hard copy printing step is then omitted. However, if a printer (such as the printer 52, for example), prints a facsimile of the betting slip with additional information already on it, then each of the shop and the customer may keep either the original or the copy.

In any event, the data relating to the transaction, including the electrical image of the betting slip, is stored in the system. Delayed-time processing (entering) of the bet may be carried out by a settler—for example, as described above—and likewise eventual payout. If desired, only winning bets may be entered and calculated for payout.

The delayed-time processing of bets may be particularly advantageous. Previous attempts, by whatever means, to input bets into a system have been frustrated by problems of real-time activity at the till transaction. In the above described embodiments of the invention, this problem has been overcome by inputting at the point of sale only those details that need to be known for security, thereby allowing delayed time input of the bet details, regardless of whether the event has been concluded and the results given.

In the above, the electrical image of a betting slip need not include the whole of the slip. For example, headings and logos may be extraneous matter, so far as bet entry and calculation are required, and occupy valuable storage space unnecessarily. Unwanted matter may be omitted by, for example, restricting the image field, and/or filtering of pre-printed matter of a selected colour. The latter may be particularly applicable to the processing of mark sense forms.

Figure 8:
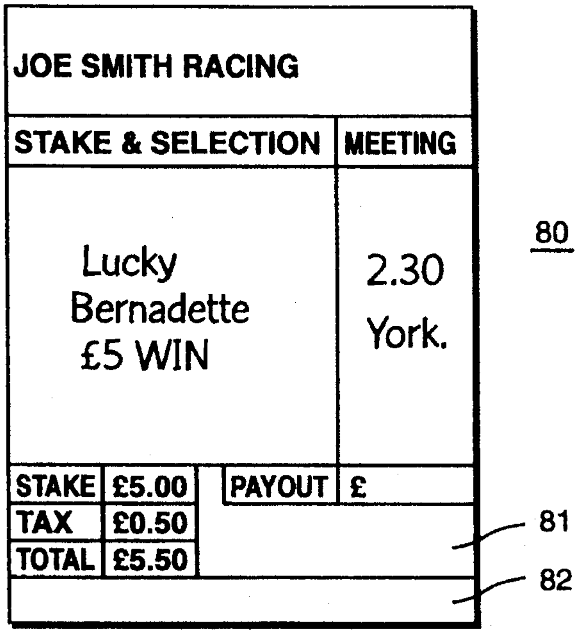
FIG. 8 illustrates a typical betting slip.

By way of example, the layout of a typical betting slip 80 is shown in FIG. 8. This is a two-pan slip, having a top part 81 and offset or oversize bottom part 82 which extends below the top part.

In the above-described embodiments of the invention, the or each CCD device may conveniently comprises a 2-dimensional array of CCD elements. Alternatively, there may be provided a 1-dimensional array of CCD (or other light-sensitive) elements, with a suitable transport mechanism to facilitate line-by-line scanning of the betting slip, 2-dimensional arrays of elements may also be used with a transport mechanism, to facilitate scanning at more than one line at a time.

A communications link between betting shop terminal and an external site may be provided by a satellite link for receiving incoming information in the shop, and a hard-wired link (e.g. PSTN) for transmitting outgoing information from the shop.

Although thermal printers are mentioned in the above, alternative printers (e.g. impact, ink-jet or laser printers) may be used.

Although magnetic cards and magnetic card readers are mentioned in the above, cards and readers having alternative data storage and reader means (e.g. microchip memories and readers) may be employed.

We claim:

1. Apparatus for receiving and processing a bet, comprising:

(a) first input means for receiving first input data relating to an event on which bets are to be taken;

(b) second input means for receiving second input data relating to an individual bet on said event, said second input means comprising an input portion for receiving a slip having characters thereon;

(c) receipt generating means for generating a receipt for said second input data;

(d) storing means for storing said first and second input data; and (e) calculating means for calculating the payout value of a bet from said first and second input data;

wherein:

(1) said apparatus further comprises:

electrical imaging means for forming an image of at least part of a slip in or at said input portion and generating an electrical image signal representing said image; and output means for receiving said electrical image signal and processing the signal to display the image on a display means and/or print a hard copy of said image;

(2) said storing means is arranged to store said electrical image signal together with the respective said second input data; and (3) said receipt, generating means is arranged either to generate a receipt which comprises said hard copy together with additional identifying information, or to generate a receipt which comprises at least part of said slip, together with additional identifying information.

2. Apparatus according to claim 1, wherein said second input means comprises a recess to receive a slip therein.

3. Apparatus according to claim 1, wherein said electrical imaging means comprises a two-dimensional array of charge-coupled devices.

4. Apparatus according to claim 1, wherein said output means comprises a thermal printer.

5. Apparatus according to claim 1, wherein said receipt comprises said hard copy and said additional identifying information is adjacent said image on said hard copy.

6. Apparatus according to claim 1, further comprising key means for entering control instructions for said apparatus and/or data to be stored by said storing means and/or information which is displayed on said receipt.

7. Apparatus according to claim 1, wherein said storing means is arranged to store said image signal together with its respective second input data, and successive such image signals together with respective such second input data.

8. Apparatus according to claim 7, wherein said output means comprises display means for displaying said image, and is arranged to control the display means to selectively display an image corresponding to a selected one of said image signals stored in said storage means.

9. Apparatus according to claim 1, wherein said output means comprises display means for displaying said image, and is arranged to control the display means to display simultaneously, in predetermined positions, said image together with data fields for displaying at least some of said input data.

10. Apparatus according to claim 9, wherein said output means is arranged to control the display means to display said image and data fields together on a common screen.

11. Apparatus according to claim 9, wherein said output means is arranged to control the display means to display said data fields in a layout of at least one form separate from said image.

12. Apparatus according to any of claim 9, wherein said second input means comprises means whereby a user can input items of said second input data, which items are displayed in said data fields.

13. Apparatus according to claim 12, wherein said second input means and output means are arranged to recognise initial character entries from a user and display at least one data item that has initial characters corresponding to said initial character entries from the user.

14. Apparatus according to claim 12, wherein said output means is arranged to control the display means to display multiple choice data items in said data fields, which items are selectable in response to data input by a user by said second input means.

15. Apparatus according to claim 9, wherein said output means is arranged to control the display means to display selected data items in said data fields in different video modes.

16. Apparatus according to claim 1, wherein said second input means comprises a reader for reading marks on a mark sense slip in or at said input portion.

17. Apparatus according to claim 1, further comprising a cash drawer.

18. Apparatus according to claim 1, further comprising a magnetic card reader, means for carrying out a transaction with a card read by said reader, and means for storing data corresponding to an amount of money received by such a transaction.

19. Apparatus according to claim 1, further comprising a bar code reader for reading a bar code on a said receipt, means for decoding the read bar code, and means for retrieving from said storing means a respective said image signal and second input data relating to said receipt.

20. Apparatus according to claim 1, further comprising communication means for receiving and/or transmitting data from and/or to a remote station.

21. Apparatus according to claim 20, wherein said first input means is arranged to receive said first input data from a remote station, by means of said communication means.

22. A plurality of apparatuses according to claim 20, arranged to share and process common data.

23. A combination of at least one apparatus according to claim 1, together with a said slip on which said characters represent said second input data.

24. A betting shop provided with at least one apparatus according to claim 1.

25. A method of receiving and processing a bet, comprising the steps of:

locating a slip in or at said input portion of said second input means of an apparatus according to claim 1;

receiving said first input data by means of said first input means;

forming an image of said slip in or at said input portion of said second input means and generating an electrical image signal representing said image, by means of said electrical imaging means;

receiving said second input data by means of said second input means;

storing said electrical image signal together with the respective said second input data, by means of said storing means;

receiving said electrical image signal and processing the signal to display the image on a display means and/or print a hard copy of said image, by means of said output means;

generating a receipt which comprises either said hard copy or at least part of said slip, together with additional identifying information, by means of said receipt generating means; and calculating the payout value of a bet from said first and second input data, by means of said calculating means.

26. A method according to claim 25, wherein a user enters items of said second input data by reading data from the respective image displayed by said display means and entering that data in at least some of said data fields.

* * * * *